US012598188B2

(12) United States Patent
Keller et al.

(10) Patent No.: US 12,598,188 B2
(45) Date of Patent: Apr. 7, 2026

(54) SYSTEM AND METHOD FOR DESCRIBING AND VISUALIZING ALLOWED, DENIED, CHAINED AND EFFECTIVE ACCESS TO A SYSTEM

(71) Applicant: SailPoint Technologies, Inc., Austin, TX (US)

(72) Inventors: Kristopher A. Keller, Cookeville, TN (US); Manoj K. Guglani, Los Gatos, CA (US)

(73) Assignee: SailPoint Technologies, Inc., Austin, TX (US)

(*) Notice: Subject to any disclaimer, the term of this patent is extended or adjusted under 35 U.S.C. 154(b) by 315 days.

(21) Appl. No.: 18/326,705

(22) Filed: May 31, 2023

(65) Prior Publication Data

US 2024/0406180 A1 Dec. 5, 2024

(51) Int. Cl.
H04L 41/22 (2022.01)
H04L 9/40 (2022.01)

(52) U.S. Cl.
CPC ............ H04L 63/102 (2013.01); H04L 41/22 (2013.01)

(58) Field of Classification Search
CPC ......... H04L 41/22; H04L 41/28; H04L 41/29; H04L 41/30; H04L 41/5009; H04L 41/5022; H04L 41/5012; H04L 41/5025; H04L 41/5029; H04L 41/5061
USPC ........................................ 709/220, 224–229
See application file for complete search history.

(56) References Cited

U.S. PATENT DOCUMENTS

| | | | |
|---|---|---|---|
| 9,276,942 B2 | 3/2016 | Srinivasan | |
| 9,692,748 B2 | 6/2017 | Maheshwari | |
| 9,761,119 B1 * | 9/2017 | Trundle | G08B 29/16 |
| 10,291,638 B1 * | 5/2019 | Chandana | G06F 7/24 |
| 10,310,745 B2 * | 6/2019 | Wu | G06F 3/0688 |
| 10,798,084 B1 | 10/2020 | Rose | |
| 10,878,483 B1 * | 12/2020 | Felbinger | G06Q 30/0633 |
| 11,178,182 B2 | 11/2021 | Saxena | |
| 11,223,559 B2 * | 1/2022 | Rahman | H04L 45/28 |
| 11,516,203 B2 | 11/2022 | Rose | |
| 11,711,401 B2 * | 7/2023 | Solari | H04L 63/0823 726/3 |
| 12,010,120 B2 * | 6/2024 | Parks | G06N 7/01 |
| 12,041,046 B2 | 7/2024 | Rose | |

(Continued)

FOREIGN PATENT DOCUMENTS

| | | | | | |
|---|---|---|---|---|---|
| CA | 2907301 C | * | 4/2023 | ........... | G06F 21/602 |
| CN | 102571821 A | * | 7/2012 | | |
| CN | 114385367 A | * | 4/2022 | | |

OTHER PUBLICATIONS

Notice of Allowance for U.S. Appl. No. 17/944,319, mailed Mar. 6, 2024, 9 pgs.

(Continued)

*Primary Examiner* — Khanh Q Dinh

(74) *Attorney, Agent, or Firm* — Sprinkle IP Law Group

(57) ABSTRACT

Systems and methods are disclosed relating to identity governance and privileged access control in a distributed networked computing environment for cloud based computing services. Embodiments disclosed include a logical model developed to describe the effective access of multiple cloud service providers (CSPs), each of which may be based on different access systems. The resulting system can then provide a singular experience across all CSPs used by users, giving users a clear picture of how access is achieved.

20 Claims, 9 Drawing Sheets

(56) References Cited

U.S. PATENT DOCUMENTS

| | | | | |
|---|---|---|---|---|
| 2013/0007845 | A1* | 1/2013 | Chang | H04L 63/104 |
| | | | | 726/4 |
| 2015/0269383 | A1 | 9/2015 | Lang | |
| 2017/0099344 | A1* | 4/2017 | Hadfield | H04L 63/20 |
| 2018/0069899 | A1 | 3/2018 | Lang | |
| 2018/0234480 | A1* | 8/2018 | Rezvani | G06F 3/04817 |
| 2018/0367526 | A1* | 12/2018 | Huang | H04L 63/0807 |
| 2019/0068612 | A1* | 2/2019 | Eads | H04L 63/105 |
| 2019/0327271 | A1 | 10/2019 | Saxena | |
| 2019/0373006 | A1* | 12/2019 | Chandana | H04L 63/1425 |
| 2020/0019414 | A1* | 1/2020 | Byard | G06F 9/44526 |
| 2020/0358756 | A1 | 11/2020 | Rose | |
| 2021/0075727 | A1* | 3/2021 | Chen | H04L 45/50 |
| 2022/0271958 | A1* | 8/2022 | Bassili | G06Q 20/367 |
| 2022/0311777 | A1* | 9/2022 | Makenzi | H04L 63/0263 |
| 2023/0021041 | A1 | 1/2023 | Rose | |
| 2023/0153426 | A1* | 5/2023 | Grobelny | G06F 21/572 |
| | | | | 726/22 |

OTHER PUBLICATIONS

CIS Benchmarks, CIS Amazon Web Services Foundations, v1.2.0, May 23, 2018, 158 pages.

International Search Report and Written Opinion issued in PCT Application No. PCT/US19/28390, mailed Jul. 18, 2019, 9 pages.

Office Action issued in U.S. Appl. No. 16/389,755, mailed Apr. 21, 2021, 12 pages.

International Preliminary Report on Patentability mailed Oct. 20, 2020, and Written Opinion mailed Jul. 18, 2019, issued in International Patent Application No. PCT/US19/28390, 7 pages.

Notice of Allowance issued in U.S. Appl. No. 16/389,755, mailed Aug. 2, 2021, 15 pages.

Notice of Allowance issued in U.S. Appl. No. 16/942,416, mailed Jul. 11, 2022, 13 pages.

* cited by examiner

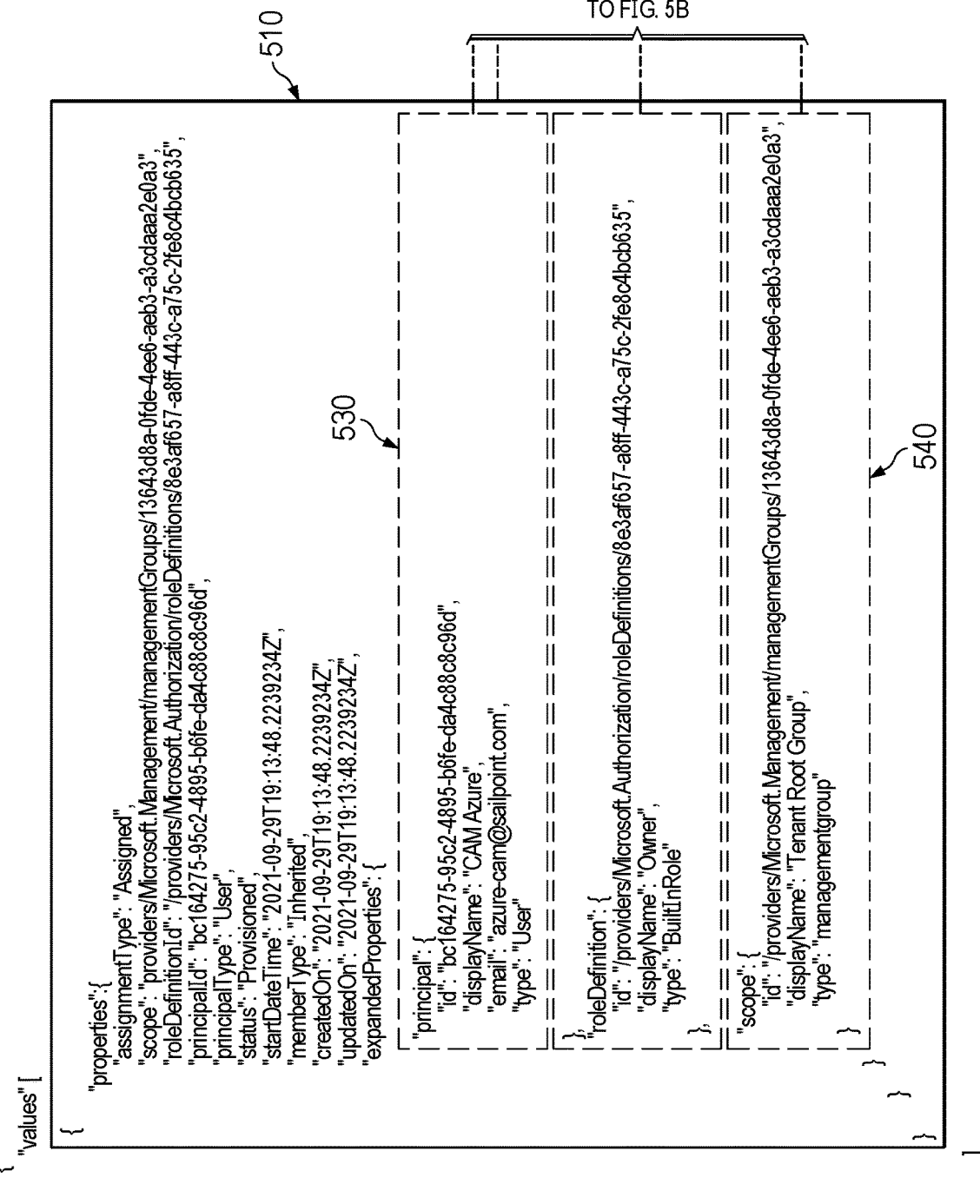

```
{ "values" [
  {
    "properties": {
      "assignmentType": "Assigned",
      "scope": "providers/Microsoft.Management/managementGroups/13643d8a-0fde-4ee6-aeb3-a3cdaaa2e0a3",
      "roleDefinitionId": "/providers/Microsoft.Authorization/roleDefinitions/8e3af657-a8ff-443c-a75c-2fe8c4bcb635",
      "principalId": "bc164275-95c2-4895-b6fe-da4c88c8c96d",
      "principalType": "User",
      "status": "Provisioned",
      "startDateTime": "2021-09-29T19:13:48.2239234Z",
      "memberType": "Inherited",
      "createdOn": "2021-09-29T19:13:48.2239234Z",
      "updatedOn": "2021-09-29T19:13:48.2239234Z",
      "expandedProperties": {
        "principal": {
          "id": "bc164275-95c2-4895-b6fe-da4c88c8c96d",
          "displayName": "CAM Azure",
          "email": "azure-cam@sailpoint.com",
          "type": "User"
        },                                                        530
        "roleDefinition": {
          "id": "/providers/Microsoft.Authorization/roleDefinitions/8e3af657-a8ff-443c-a75c-2fe8c4bcb635",
          "displayName": "Owner",
          "type": "BuiltInRole"
        },
        "scope": {
          "id": "/providers/Microsoft.Management/managementGroups/13643d8a-0fde-4ee6-aeb3-a3cdaaa2e0a3",
          "displayName": "Tenant Root Group",
          "type": "managementgroup"
        }
      }
    }
  }
]
}
```

OBTAIN CLOUD SERVICE
PROVIDER IDENTITY
MANAGEMENT DATA 7-12

NORMALIZE IDENTITY
MANAGEMENT DATA 7-14

DETERMINE RIGHTS OF
USERS AND GROUPS 7-16

APPLY TO
ACCESS MODEL 7-18

DISPLAY A GRAPHICAL
REPRESENTATION OF THE
RIGHTS OF A USER

1

SYSTEM AND METHOD FOR DESCRIBING AND VISUALIZING ALLOWED, DENIED, CHAINED AND EFFECTIVE ACCESS TO A SYSTEM

TECHNICAL FIELD

This disclosure relates generally to computer security. In particular, this disclosure relates to identity governance and privileged access control in a distributed networked computing environment by providing identity management for cloud based computing services.

BACKGROUND

Identity Management (IM), also known as Identity and Access Management (IAM) or Identity Governance and Administration (IGA) is the field of computer security concerned with the enablement and enforcement of policies and measures which allow and ensure that the right individuals access the right resources at the right times and for the right reasons. IM addresses the need to ensure appropriate access to resources across increasingly heterogeneous technology environments and to meet increasingly rigorous compliance requirements.

In a typical identity management system, the system grants access to relevant access items to various identities, in response to an access request. An access request may be the formal process in enterprise identity governance, to grant an access entitlement (typically for the first time) to an identity. Usually, the manager of the identity, or the entitlement owner will make a decision to approve or deny the requested entitlement(s) to the said identity. An access request can originate from the identity, a manager of the identity, or from the system itself, for example.

Such IM goals are especially difficult with respect to enterprises that employ or otherwise utilize cloud based computing platforms or services (collectively cloud based computer services, cloud service providers or just cloud services or platform, all used herein interchangeably). Each cloud service provider (CSP) has a unique way of configuring and viewing which identities have access to resources and services within that CSP and at what access level. The steps taken by a user and the user experience within the CSP portals are different. Furthermore, each CSP can only show access within itself. Each CSP may be able to show that there is federated access, but cannot provide the full access paths from the accessible service/resource to the real/actual identity. Many organizations make use of multiple CSPs where consistent views and management of effective access are crucial, as well as the ability to see federated access across those CSPs.

Previous systems typically have no defined data/persistence model and dealt with each CSPs data in a different manner that closely mirrored the underlying CSP. As a result, the scale of each service/api suffers due to complex and ever growing queries to present underlying CSP data.

It would be desirable to boost productivity by providing a model for describing and visualizing allowed, denied, chained and effective access to a system using various CSPs.

SUMMARY

An embodiment of an identity management system includes a processor, and a non-transitory, computer-readable storage medium. The computer-readable storage medium includes instructions for obtaining identity management data from a plurality of cloud service providers, the identity management data from each respective cloud service provider comprising data relating to rights and permissions associated with users of the respective cloud service provider, for each of the plurality of cloud service providers, normalizing the identity management data of the respective cloud service provider to match terminology used by each of the plurality of cloud service providers, for each of the plurality of cloud service providers, evaluating the respective normalized identity management data to determine rights of users and groups associated with the respective cloud service provider, applying the determined rights of the plurality of cloud service providers to an access model to determine rights of users and groups across the plurality of cloud service providers, and presenting over a graphical user interface a graphical representation of the rights of a user across the plurality of cloud service providers.

Another embodiment provides a method, including obtaining identity management data from a plurality of cloud service providers, the identity management data from each respective cloud service provider comprising data relating to rights and permissions associated with users of the respective cloud service provider, for each of the plurality of cloud service providers, normalizing the identity management data of the respective cloud service provider to match terminology used by each of the plurality of cloud service providers, for each of the plurality of cloud service providers, evaluating the respective normalized identity management data to determine rights of users and groups associated with the respective cloud service provider, applying the determined rights of the plurality of cloud service providers to an access model to determine rights of users and groups across the plurality of cloud service providers, and presenting over a graphical user interface a graphical representation of the rights of a user across the plurality of cloud service providers.

Another embodiment provides a non-transitory computer readable medium, comprising instructions for obtaining identity management data from a plurality of cloud service providers, the identity management data from each respective cloud service provider comprising data relating to rights and permissions associated with users of the respective cloud service provider, for each of the plurality of cloud service providers, normalizing the identity management data of the respective cloud service provider to match terminology used by each of the plurality of cloud service providers, for each of the plurality of cloud service providers, evaluating the respective normalized identity management data to determine rights of users and groups associated with the respective cloud service provider, applying the determined rights of the plurality of cloud service providers to an access model to determine rights of users and groups across the plurality of cloud service providers, and presenting over a graphical user interface a graphical representation of the rights of a user across the plurality of cloud service providers.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 5 and 6 are split in the drawings into FIGS. 5A-5B and FIGS. 6A-6B, respectively.

DETAILED DESCRIPTION

Figure 1:
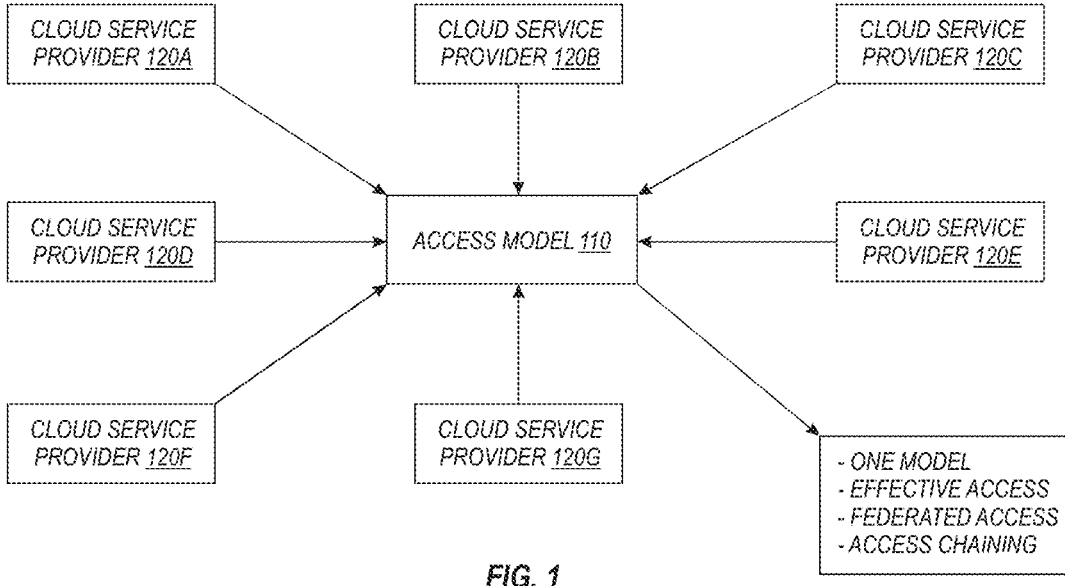
FIG. 1 depicts a logical access model used in conjunction with a plurality of cloud service providers.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. In response to regulatory requirements and security access risks and concerns, most enterprises have implemented some form of computer security or access controls. To assist in implementing security measures and access controls in an enterprise environment, many of these enterprises have implemented Identity Management in association with their distributed networked computer environments. Identity Management solutions allow the definition of particular identity management artifacts (including but not limited to, an identity, entitlement, application, account, role, event, policy, group, permission, user, owner, source, configuration, organization, violation, governance group, access profile or account activity) such that these artifacts may be associated and managed accordingly. For example, an identity may be almost physical or virtual thing, place, person or other item that an enterprise would like to define. Identities can therefore be, for example, certain capacities (e.g., manager, engineer, team leader, etc.), titles (e.g., Chief Technology Officer), groups (development, testing, accounting, etc.), processes (e.g., nightly back-up process), physical locations (e.g., cafeteria, conference room), individual users or humans (e.g., John Locke) or almost any other physical or virtual thing, place, person or other item.

To continue with examples of how these identity governance artifacts may be used, each of these identities may therefore be assigned zero or more entitlements with respect to the distributed networked computer environments. An entitlement may be the ability to perform or access a function within the distributed networked computer environments, including, for example, accessing computing systems, applications, file systems, particular data or data items, networks, subnetworks or network locations, etc. To facilitate the assignment of these entitlements, enterprises may also be provided with the ability to define roles or other identity management artifacts within the context of their Identity Management solution. A role within the context of Identity Management may be a collection of entitlements. These roles may be assigned a name or identifiers (e.g., manager, engineer, team leader) by an enterprise that designate the type of user or identity that should be assigned such a role. By assigning a role to an identity in the Identity Management context, the identity may be assigned the corresponding collection of entitlements associated with the assigned role. Accordingly, by defining these roles enterprises may define a "gold standard" of what they desire their identity governance to look like.

Thus, by managing the identity management artifacts using an identity management system, identity governance may be facilitated. For example, by managing the artifacts (e.g., identity or identities, roles, entitlements, etc.) to which users within the enterprise computing environment are assigned, the entitlements or roles to which a user may be assigned (e.g., the functions or access which a user may be allowed) may be controlled. Furthermore, by defining other identity management artifacts, such as more granular access permissions, identity management events or activity may also be determined and evaluated to assess security risk or compliance with identity management policies or rules.

One of the main goals of IM, then, is to help users identify and mitigate risks associated with access management. As IM is the discipline that ensures compliance with defined policies by aggregating, visualizing, and managing users and their access, implementations of IM systems may enable the automation of certain process within enterprises of organizations, including for example, provisioning, certifications, access reviews, and SOD processes. Typical identity and access information available from IM solutions may utilize simple context to inform certain decision making processes, however additional, more complex and specific, context may be desirable from a variety of perspectives, including managers, owners, IT or security/regulatory departments, or others. Without such complex contextual data information management systems may suffer from low workflow efficiency and lower security. One example of a system for automating access control management for computing systems is described in U.S. Pat. No. 11,178,182, published on Nov. 16, 2021, and is incorporated by reference herein in its entirety.

It is desirable for identity management solutions to offer the capability for the provisioning of detailed and relevant contextual identity governance information for an enterprise. As enterprises move functionality and sensitive data to cloud platforms, identity governance with respect to these cloud-based platforms utilized by an enterprise is challenging. Typically, these CSPs each have their own proprietary identity or access management capabilities. For example, Amazon Web Services (AWS) employs their Identity and Access Management (IAM), a web service that helps control access to AWS resources. AWS' IAM can be used to control who is authenticated (e.g., signed in) and authorized (e.g., has permissions) to use resources. These CSPs thus have their own IAM entities that may be used to manage access, or resources accessible, by users of an enterprise which utilizes the cloud services. Continuing with the above example, AWS employs IAM entities such as Users, Groups, Roles, Inline Policies, Managed Policies, Service Control Policies, etc. Similarly, other CSPs (e.g., Microsoft Azure, Google Cloud Platform (GCP), Okta, etc.) also have their own proprietary identity or access management capabilities. One example of a system for identity management of cloud based computing services is described in U.S. Pat. No. 10,798,084, published on Oct. 6, 2020, and is incorporated by reference herein in its entirety.

Generally, in the disclosed system, a logical model is developed to describe the effective access of multiple CSPs, each of which may be, for example, a role-based access control (RBAC) or an attribute-based access control (ABAC) based system. RBAC and ABAC are the two most common systems deployed by organizations. Generally, RBAC authenticates users based on their role, while ABAC uses specific characteristics of the user, resource, and environment, as one skilled in the art would understand. As mentioned above, for a given CSP, users gain permissions in the respective environment in a different ways from others. Generally, the disclose system genericizes the vocabulary of various CSP systems, since the concepts used (e.g., entitlements, permissions, etc.) for access control the providers are typically the same. In other words, the disclosed system takes the proprietary language and proprietary data models of various CSPs and converts it into something that is common across all of the CSPs. In other words, the system normalizes terms (descriptors, variables, etc.) used by the CSPs, such that the normalized identity management data is common across all of the CSPs. The resulting system can then provide a singular experience across all CSPs used by users. This approach gives the user a clear picture of how access is achieved, even more so than the CSP itself. This approach also provides a consistent approach for modeling access no matter the CSP or application. This approach highlights the complex access models where access is achieved in a federated and/or chaining mechanism across accounts and providers. Since the system is normalizing access, permissions, etc. across different CSPs, a model can also show where there is federated access. For example, a user can jump from one CSP to another CSP, and the model can show why it is allowed. Similarly, even within one CSP, a user can jump from one role or policy set to another, and the model will also illustrate that. All of this is possible without a user having to b proficient of all of the providers.

Figure 2:
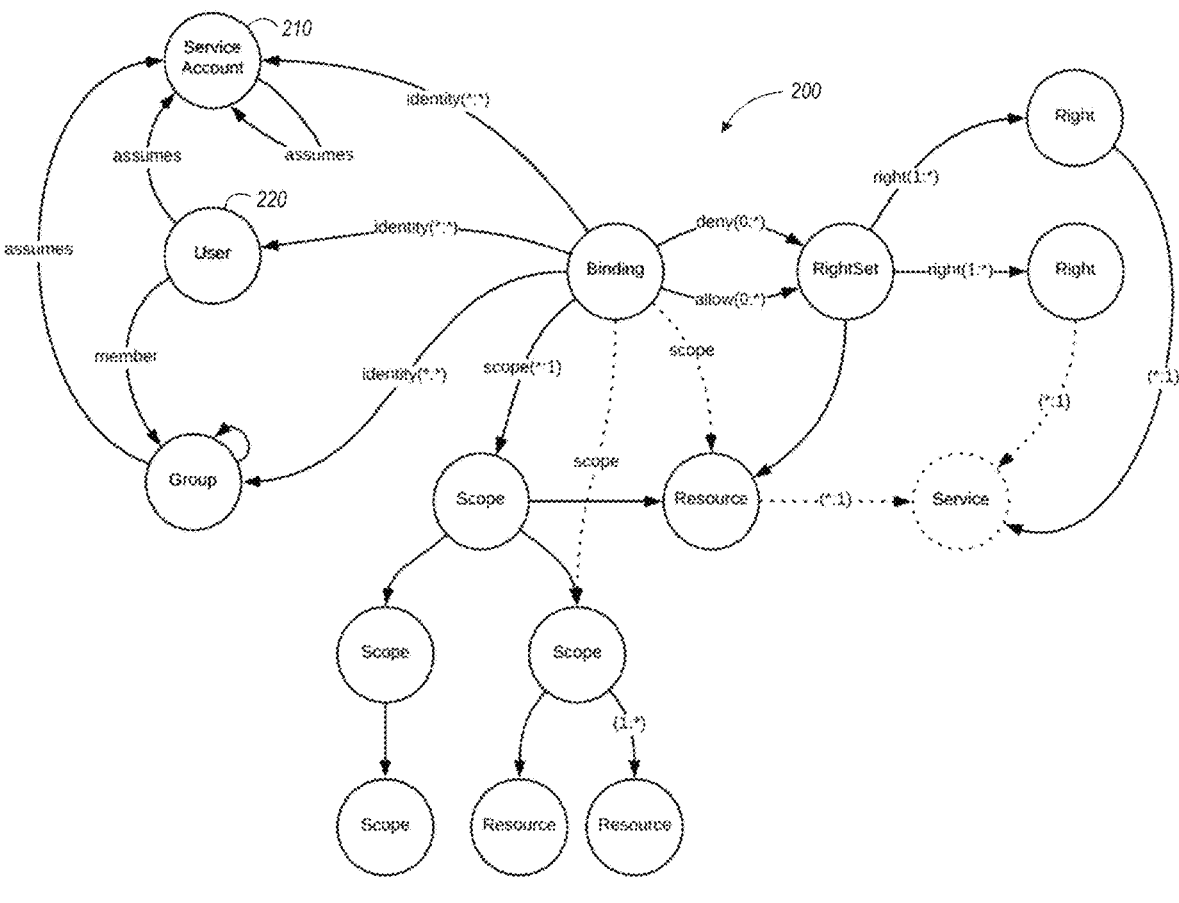
FIG. 2 depicts an example of a generalized model used in conjunction with a plurality of cloud service providers.

As shown in FIG. 1, a logical access model 110 is shown, along with a plurality of CSPs 120A-120G, which may include any desired CSP, such as the examples listed above. FIG. 2 is a diagram illustrating a generalized model 200. For each cloud system integrated, a mapping from the system's real model to the generalized model 200 is created. The model 200 helps users of a system visualize who has access to what, what is accessed by who. The logical model also helps clarify allowed access vs denied access and is able to provide a complete effective access model that considers allow policies, deny policies, as well as any tenant level rules. A logical access model can also illustrate concepts such as effective access, federated access, access chaining, etc. For example, a user may have the ability to use a given cloud function, which in and of itself has permission to do something else. So if the user has permission to execute that cloud function, which itself has permission to reach or write to a database, for example, then technically the user also has permission to read or write to that database. In FIG. 2, an assumes edge is a flattening of bindings and rightsets to illustrate a simple view of role chaining (described in more detail below with respect to FIGS. 3-6). In some examples, a service account (e.g., node 210) is a resource linked to an identity (e.g., node 220) through a binding which allows for the assumption action through the rightset. Note that a rightset is a group of rights (e.g., permissions). In the example of AWS, a rightset is the actions within a statement (e.g., FIG. 4), in Azure and GCP, a rightset is the role (e.g., FIGS. 5, 6). In other words, a rightset is a collection of individual permission or actions that a user can take.

Figure 3:
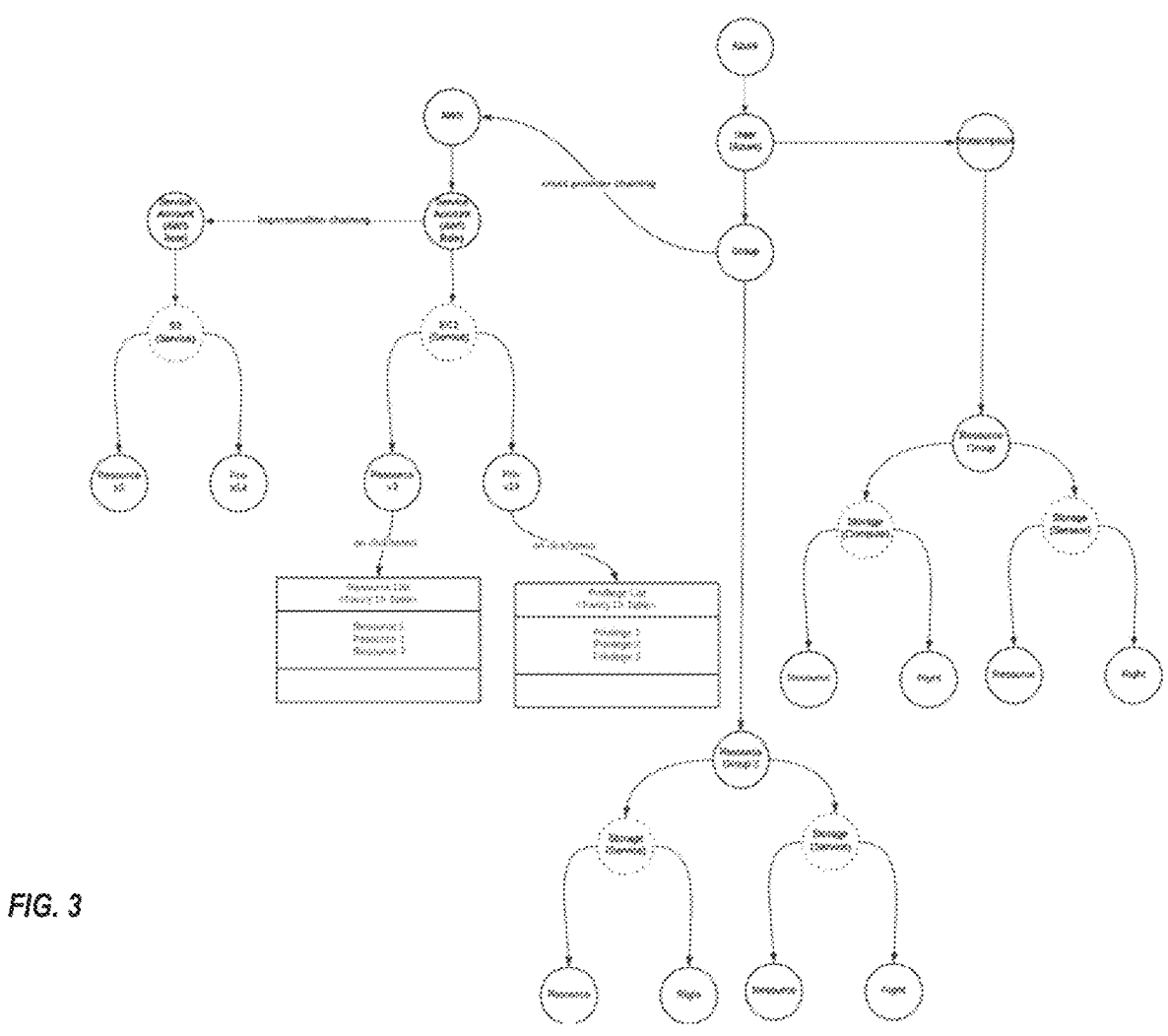
FIG. 3 depicts a logical model illustrating the effective access for a user with a plurality of cloud service providers.

FIG. 3 is a diagram of a physical model illustrating what the effective access would look like to a user once the generalized model is applied to a plurality of providers. FIG. 3 is described in more detail below with respect to exemplary providers modeled in FIGS. 4-6.

Figure 4:
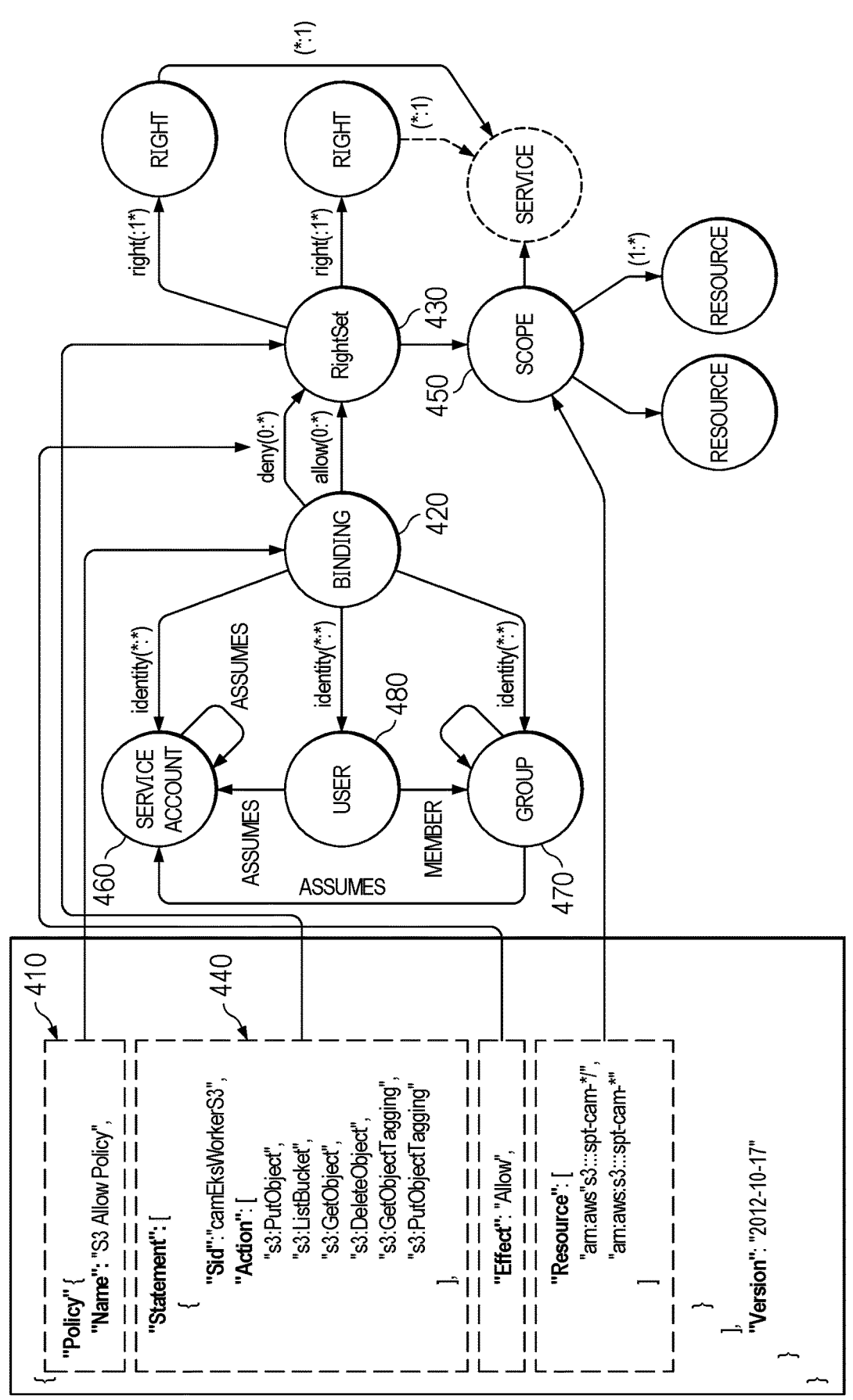
FIGS. 4-6 depict examples of cloud service providers' policies to a generalized model.
Figure 5B:
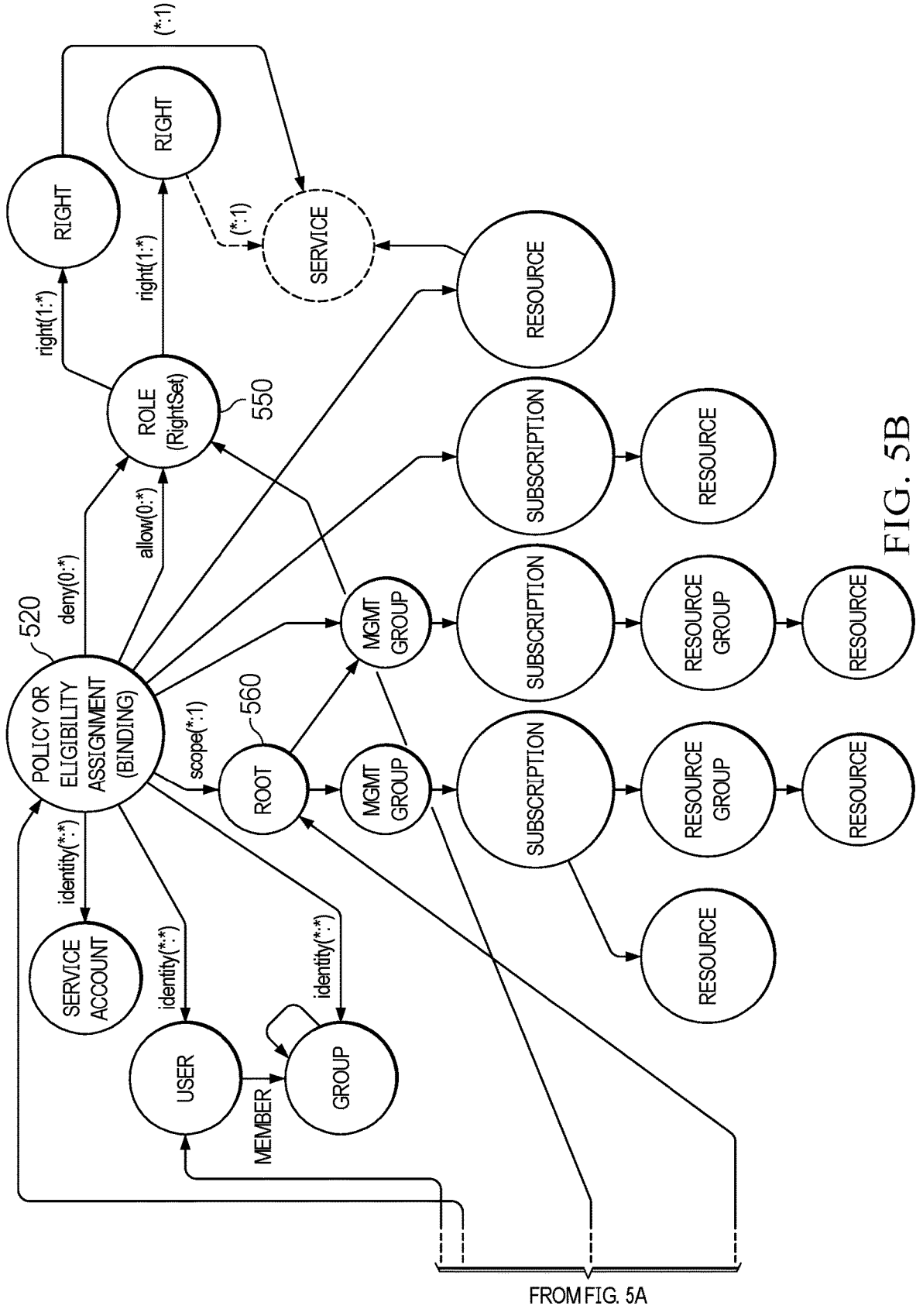
Figures 6A, 6B:
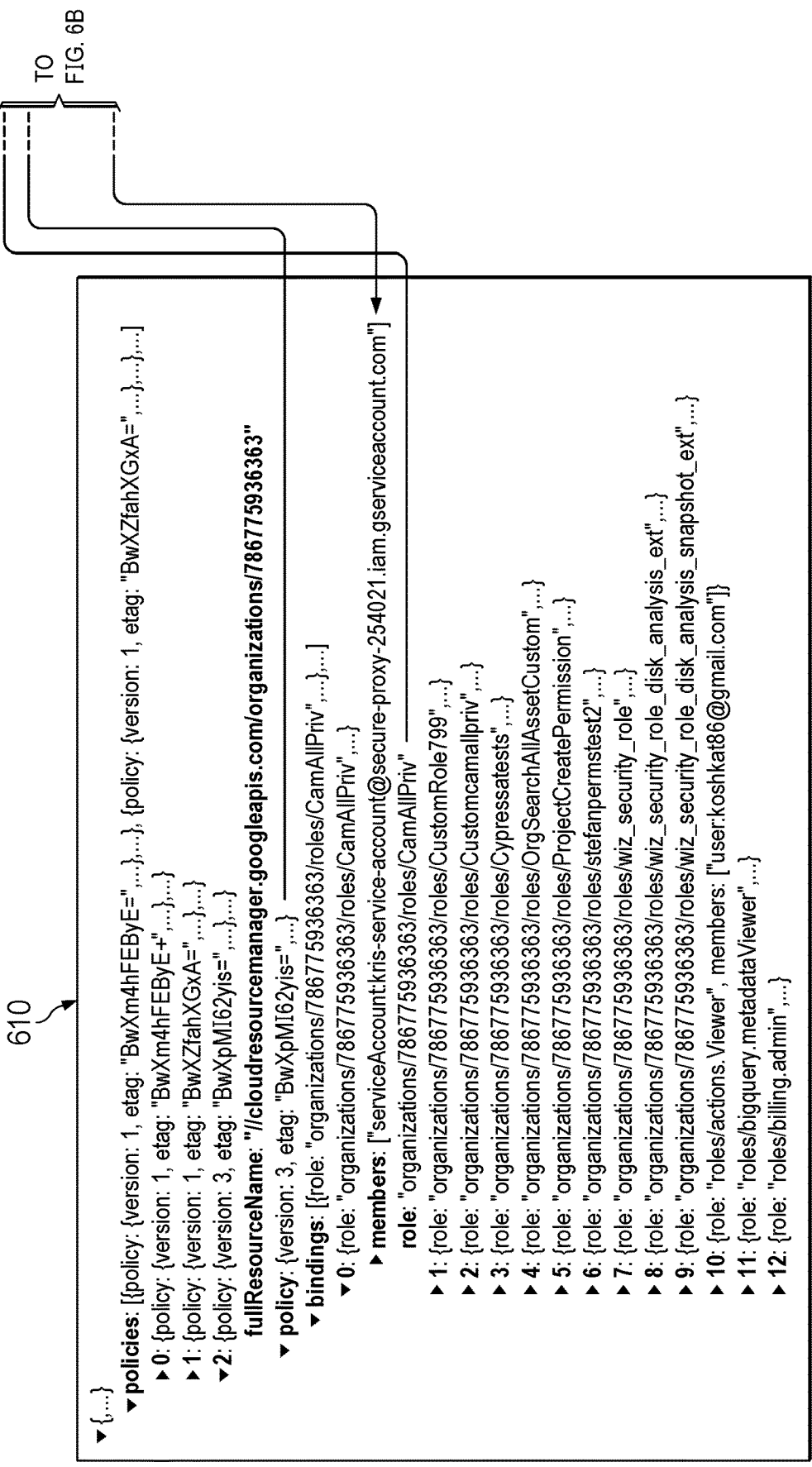
Figure 6B:
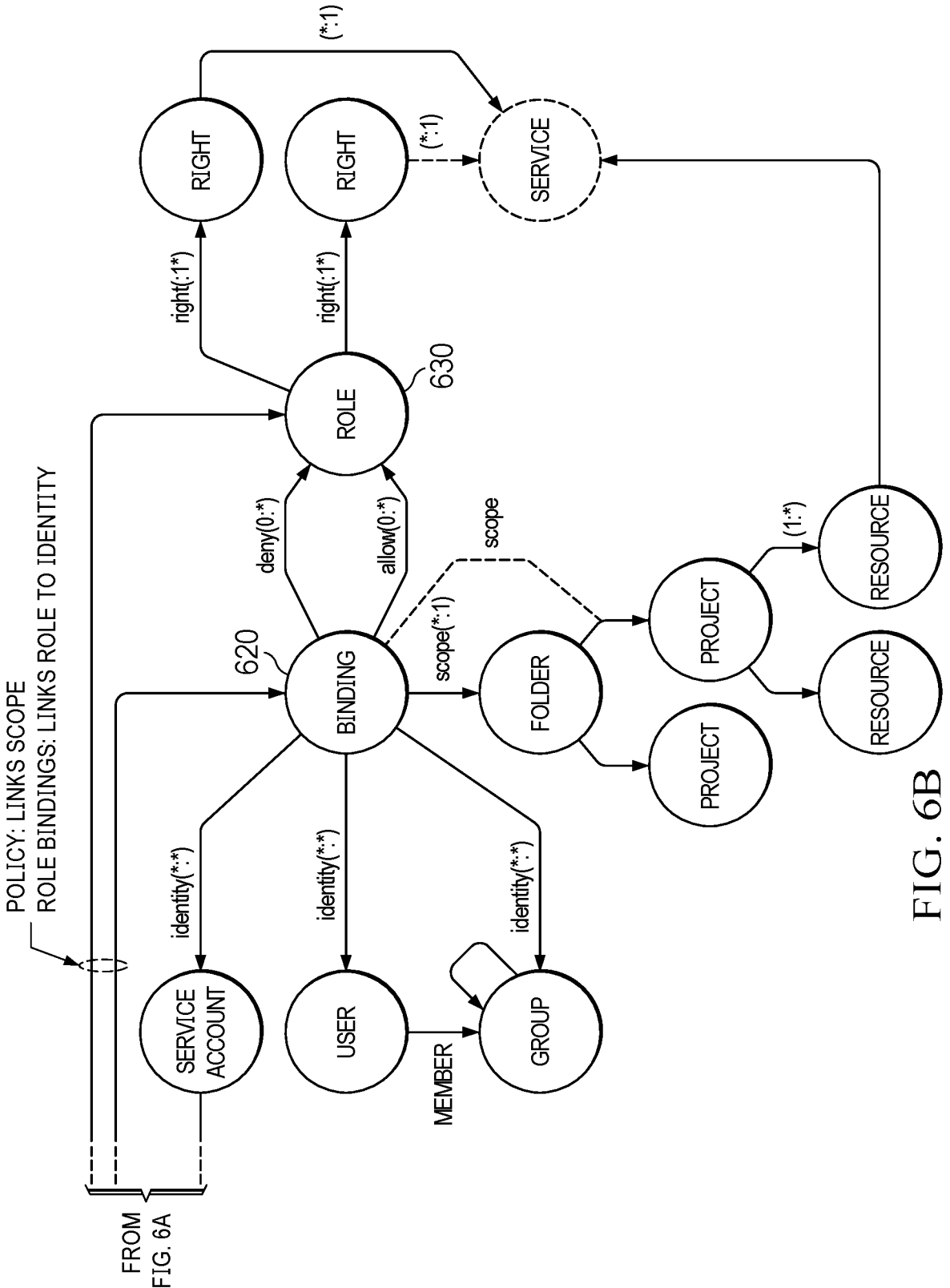

FIGS. 4-6 are diagrams illustrating specific exemplary CSP policies to the generic model described above. FIG. 4 illustrates a simplistic breakdown of AWS policy to the generic access model. In this example, role chaining can be achieved by examining security token service (STS) trusts that follow the same policy structure, but the role being chained to/assumed becomes the resource instead of an Identity/Principal. FIG. 4 illustrates that an overall policy 410 itself is what is being linked as the binding node 420. Generally, the nodes to the left of the binding node 420 represent identities (users, groups, service accounts, etc.) and the nodes to the right of the binding node 420 represent what the identities have access to (rights, resources, etc.). In other words, the identities are bound to a group of rights as you go from left to right in the diagram.

The rightset 430 is related to the block within the statement 440. Note that there can be more than one rightset. Also note that, for simplicity, FIG. 4 shows nodes representing two rights, although six are shown in the statement 440. Within the statement 440, resources are also linked, such that the resource block can become the scope 450. Thus, the diagram illustrates that a user has access to these particular resources. The diagram also illustrates that between the binding 420 and the rightset 430 you can have a deny versus allow, as determined by the statement. FIG. 4 also shows the chaining itself via the assumes edges looping back to the service account 460. The assumes edges illustrate where the group 470 can assume a service account 460 or the user 480 can assume the service account 460. In the context of AWS, a service account can be thought of as a role.

FIG. 5 illustrates a simplistic breakdown of Azure role assignments to the generic access model. As illustrated in FIG. 5, Azure has a similar approach through role assignments or eligibility assignments. FIG. 5 illustrates that an overall assignment record 510 is linked to the binding node 520 (labeled "Policy or Eligibility Assignment" in FIG. 5). FIG. 5 shows a role definition 530 and scope 540 as part of the record 510. In this example, the role definition 530 includes an ID, name, and type, and in this example, gets represented as a particular rights set (illustrated in FIG. 5 as node 550). So, this role definition would equate to an expansion of a plurality of different permissions or actions [that] that a user can take. A scope is similar, and includes an ID, name, and type. In this example, this scope is pointing to a management group (via root node 560). As shown in FIG. 5, the root node 550 is connected to a plurality of management groups, which are associated with various subscriptions, resources, resource groups, etc.

Similar to FIGS. 4 and 5, FIG. 6 illustrates a simplistic breakdown of GCP policy bindings to the generic access model. As one skilled in the art would understand from the discussions above, FIG. 6 shows an overall policy 610 that is linked to the binding node 620. Role bindings link roles to identities. An exemplary role from the policy 610 is linked to a role node 630. As shown, various rights, folders, projects, users, groups, service accounts, resources, etc., are represented in the model and defined in the policy 10.

As one skilled in the art would understand, the concepts described above with respect to FIGS. 4-6 for three exemplary providers can be applied to any other providers that are desired to be integrated into the overall system.

Referring again to FIG. 3, a logical model is shown resulting from the application of the generalized model is to the different providers (e.g., see the examples of FIGS. 4-6). FIG. 3 illustrates what the effective access would look like to a user. For example, FIG. 3 shows an example, where a user has access to both Azure and AWS resources. As shown, an Azure user (node 310) has access to an Azure subscription 320 (and all these things under that subscription, e.g., resource group 330 and the associated resources and groups). The user is also a member of a group 340 which provides the user with access to all the associated resources, rights, etc. In this example, group 340 (via a SAML configuration, for example), can also assume an AWS role (node 350), which gives this Azure user access to the associated AWS resources (cross provider chaining). In other words, FIG. 3 shows that the one model can provide the effective access (the role chaining as well as Federated access).

In some embodiments, the information depicted in FIG. 3 (as well as the other Figures) can be presented to a user over a graphical user interface of a computing device. A user may interact with the user interface to access or configure the information provided by the system.

Figure 7:
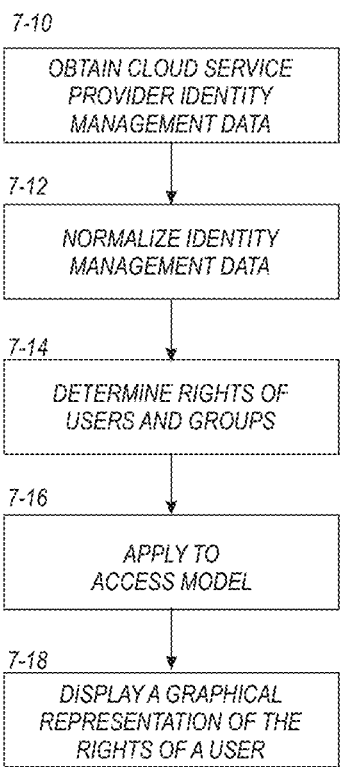
FIG. 7 is a flowchart depicting one example of process for visualizing allowed, denied, chained, and effective access to a system.

FIG. 7 is a flowchart depicting one example of process for visualizing allowed, denied, chained, and effective access to a system. Other exemplary processes are also possible. At step 7-10, identity management data is obtained from a plurality of cloud service providers. For example, in the context of the examples illustrated in FIGS. 4-6, identity management data is obtained from AWS, Azure, and GCP, although any other cloud providers could also be used. The identity management data from each respective cloud service provider may include data relating to rights and permissions associated with users of the respective cloud service provider. At step 7-12, the identity management data is normalized for each of the respective cloud service providers to match terminology used by each of the others. At step 7-14, the normalized identity management data of each provider is evaluated to determine rights of users and groups associated with the respective cloud service provider. At step 7-16, the rights of each cloud service provider are applied to an access model to determine rights of users and groups across the plurality of cloud service providers. At step 7-18, a graphical representation of the rights of a user across all of the cloud service providers is presented over a graphical user interface.

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including R, Python, C, C++, Java, JavaScript, HTML, Go, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. An identity management system, comprising:
a processor;
a non-transitory, computer-readable storage medium, including computer instructions for:
obtaining identity management data from a plurality of different cloud service providers, the identity management data from each respective cloud service provider comprising data relating to rights and permissions associated with users of the respective cloud service provider, wherein the identity management data from a respective cloud service provider uses different terminology and a different data model than other of the different cloud service providers;
for each of the plurality of cloud service providers, normalizing the identity management data of the respective cloud service provider to match normalized terminology used by each of the plurality of cloud service providers;
for each of the plurality of cloud service providers, evaluating the respective normalized identity management data to determine rights of users and groups associated with the respective cloud service provider;
applying the determined rights of the plurality of cloud service providers to an access model to determine federated rights of users and groups across the plurality of different cloud service providers; and
presenting over a graphical user interface a graphical representation of the federated rights of a user across the plurality of cloud service providers.

2. The identity management system of claim 1, wherein at least one of the plurality of cloud service providers implements role-based access control.

3. The identity management system of claim 1, wherein at least one of the plurality of cloud service providers implements attribute-based access control.

4. The identity management system of claim 1, wherein the identity management data for a given cloud service provider specifies a collection of permissions and actions that a given user is allowed to take.

5. The identity management system of claim 1, wherein the identity management data for a given cloud service provider specifies a set of resources to which a given user has access.

6. The identity management system of claim 1, wherein the identity management data for a given cloud service provider specifies one or more groups to which a given user is associated.

7. The identity management system of claim 1, wherein the graphical representation illustrates when a given user is allowed to assume a role.

8. A method, comprising:

obtaining identity management data from a plurality of different cloud service providers, the identity management data from each respective cloud service provider comprising data relating to rights and permissions associated with users of the respective cloud service provider, wherein the identity management data from a respective cloud service provider uses different terminology and a different data model than other of the different cloud service providers;

for each of the plurality of cloud service providers, normalizing the identity management data of the respective cloud service provider to match normalized terminology used by each of the plurality of cloud service providers;

for each of the plurality of cloud service providers, evaluating the respective normalized identity management data to determine rights of users and groups associated with the respective cloud service provider;

applying the determined rights of the plurality of cloud service providers to an access model to determine federated rights of users and groups across the plurality of different cloud service providers; and presenting over a graphical user interface a graphical representation of the federated rights of a user across the plurality of cloud service providers.

9. The method of claim 8, wherein at least one of the plurality of cloud service providers implements role-based access control.

10. The method of claim 8, wherein at least one of the plurality of cloud service providers implements attribute-based access control.

11. The method of claim 8, wherein the identity management data for a given cloud service provider specifies a collection of permissions and actions that a given user is allowed to take.

12. The method of claim 8, wherein the identity management data for a given cloud service provider specifies a set of resources to which a given user has access.

13. The method of claim 8, wherein the identity management data for a given cloud service provider specifies one or more groups to which a given user is associated.

14. The method of claim 8, wherein the graphical representation illustrates when a given user is allowed to assume a role.

15. A non-transitory computer readable medium, comprising instructions for:

obtaining identity management data from a plurality of different cloud service providers, the identity management data from each respective cloud service provider comprising data relating to rights and permissions associated with users of the respective cloud service provider, wherein the identity management data from a respective cloud service provider uses different terminology and a different data model than other of the different cloud service providers;

for each of the plurality of cloud service providers, normalizing the identity management data of the respective cloud service provider to match normalized terminology used by each of the plurality of cloud service providers;

for each of the plurality of cloud service providers, evaluating the respective normalized identity management data to determine rights of users and groups associated with the respective cloud service provider;

applying the determined rights of the plurality of cloud service providers to an access model to determine federated rights of users and groups across the plurality of different cloud service providers; and presenting over a graphical user interface a graphical representation of the federated rights of a user across the plurality of cloud service providers.

16. The non-transitory computer readable medium of claim 15, wherein at least one of the plurality of cloud service providers implements role-based access control.

17. The non-transitory computer readable medium of claim 15, wherein at least one of the plurality of cloud service providers implements attribute-based access control.

18. The non-transitory computer readable medium of claim 15, wherein the identity management data for a given cloud service provider specifies a collection of permissions and actions that a given user is allowed to take.

19. The non-transitory computer readable medium of claim 15, wherein the identity management data for a given cloud service provider specifies a set of resources to which a given user has access.

20. The non-transitory computer readable medium of claim 15, wherein the identity management data for a given cloud service provider specifies one or more groups to which a given user is associated.

* * * * *